United States Patent [19]

Eppley et al.

[11] 4,431,716

[45] Feb. 14, 1984

[54] HEAT ACTIVATED VENT

[75] Inventors: William J. Eppley, Skippack, Pa.; John A. Kelley, Willingboro, N.J.

[73] Assignee: Honeywell Inc., Minneapolis, Minn.

[21] Appl. No.: 465,722

[22] Filed: Feb. 11, 1983

[51] Int. Cl.³ ............................................. H01M 2/12
[52] U.S. Cl. ..................................... 429/53; 429/56; 137/68 R; 137/70; 220/202
[58] Field of Search ................. 429/56, 53; 137/68 R, 137/69, 70, 72, 73, 76, 457; 220/202

[56] References Cited

U.S. PATENT DOCUMENTS

| 1,891,183 | 12/1932 | Rowley | 137/72 |
| 3,008,479 | 11/1961 | Mancusi | 137/72 |
| 4,307,158 | 12/1981 | Thibault | 429/56 |
| 4,409,151 | 9/1977 | Schweise | 220/201 |

FOREIGN PATENT DOCUMENTS 1076494 7/1967 United Kingdom ............... 220/201

Primary Examiner—Donald L. Walton
Attorney, Agent, or Firm—Mitchell J. Halista; Trevor B. Joike

[57] ABSTRACT

A heat activated vent for releasing an excess internal pressure in a container which pressure is accompanied by an abnormal rise in an internal temperature of the container uses a spring to store sufficient energy to propel a barb or spike to pierce a thin diaphragm. The spring is retained within a hollow vent housing between an end wall of the housing and a movable plate located within the housing and carrying a diaphragm piercing upright barb. A pierceable thin diaphragm is positioned adjacent to the sharp end of the barb and is arranged to provide a leak proof seal across an open end of the housing. The barb carrying plate is normally retained in a position wherein the barb is spaced from the diaphragm by a rigid pin extending between the plate and the housing and having a lower coefficient of thermal expansion than the housing. In one embodiment of the invention, one end of the pin projects through a hole in the plate and has a radially expanded head which engages the barb carrying plate. The other end of the pin is retained in a hole in the vent housing as a result of a shrink fit in the hole in the housing. The expanded head of the pin may be located on the outside surface of the vent housing while the body of the pin passes through a hole into the vent housing and is retained by a shrink fit in a hole in the plate.

13 Claims, 2 Drawing Figures

HEAT ACTIVATED VENT

BACKGROUND OF THE INVENTION

1. Field of the Invention

The present invention relates to vents. More specifically, the present invention is directed to a heat activated vent.

SUMMARY OF THE INVENTION

An object of the present invention is to provide an improved heat activated vent.

In accomplishing this and other objects, there has been provided, in accordance with the present invention a heat activated vent having a housing means with a fluid passage therein, a diaphragm means arranged to seal the fluid passage in the housing means, a diaphragm piercing means in the housing means and spaced from the diaphragm, spring means for urging the piercing means into the diaphragm means and temperature responsive means for spacing the piercing means from the diaphragm in opposition to the spring means below a predetermined temperature of the housing means.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
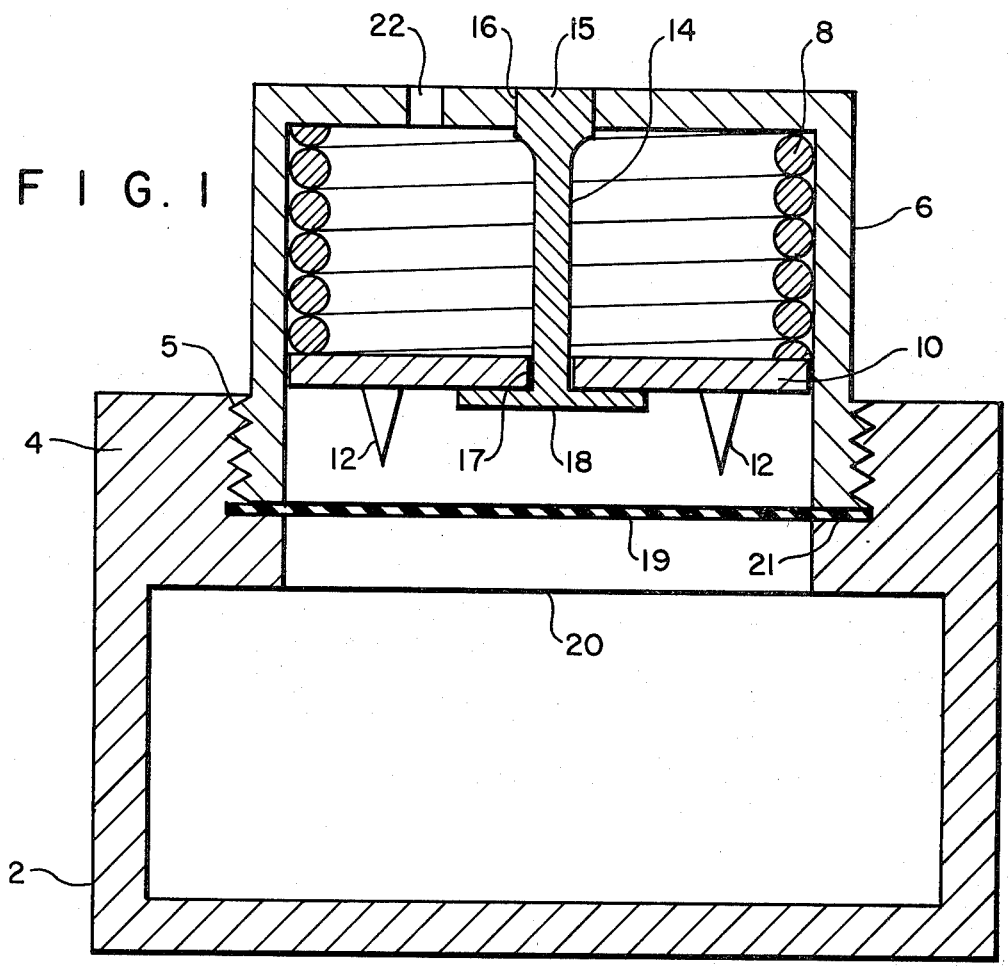
FIG. 1 is a cross-sectional illustration of a heat activated vent embodying a first example of the present invention and FIG. 2 is a cross-sectional illustration of a heat activated vent embodying a second example of the present invention.

Referring to FIG. 1 in more detail, there is shown a container 2 for containing an internal pressure which is to be released during an excess pressure condition by the heat activated vent of the present invention. While the present invention is useful in many applications, the container 2 may, for example, be a battery such as a lithium battery which has a working pressure within the battery and an overload pressure produced during a battery abuse operation which overload pressure must be vented to prevent an explosion of the battery container. The excessive rise in internal pressure within the battery is accompanied by an abnormal rise in the internal temperature of the battery and the temperature of the container 2. The container 2 includes an integral inwardly extending collar 4 having an internally threaded free end 5 for accepting an externally threaded end of a hollow vent housing or cap 6. A coil spring 8 is located within the vent housing 6 and is used to bias a movable coaxial plate 10 loosely captured within the vent housing 6, i.e., the spring 8 is located between an internal wall of the housing 6 and the plate 10. A plurality of diaphragm piercing upright barbs 12 are located on a face of the plate 10 opposite to the face contacted by the spring 8 with the pointed ends of the barbs 12 facing outwardly from the plate 10.

A restraining pin 14 is used to locate the plate 10 in the housing 6 against the force exerted by the spring 8 during a normal temperature operation of the vent, i.e., the spring 8 is retained in a compressed state. The pin 14 has a first end 15 retained in a hole 16 in an end of the vent housing 6 by a shrink fit therein. The pin 14 is made of a material having a low coefficient of thermal expansion, e.g., Invar K, while the vent housing 6 may be of a material having a higher coefficient of thermal expansion, e.g., stainless steel. The other end of the pin 14 passes through a hole 17 in the plate 10 and has a radially expanded head 18 located on the same size of the plate 10 as the barbs 12. A pierceable thin diaphragm 19 of a suitable material is positioned across a coaxial fluid passage 20 in the integral collar 4 of the housing 2 to separate the passage 20 from the internal space of the vent housing 6. The diaphragm 18 is arranged to provide a leak proof seal across the opening 20, e.g., a peripheral edge of the diaphragm 18 may be clamped between the threaded end of the housing 6 and a coaxial step within the integral collar 4 of the housing 2 when the housing 6 is threaded into the collar 4. The diaphragm 18 is spaced from the pointed ends of the barbs 12 during a normal temperature operation of the vent by the restraining operation of the pin 14 on the plate 10.

An abnormal temperature rise of the container 2 accompanied by an excess internal pressure is transmitted to the vent cap 6 and is efective to produce a temperature expansion of the vent cap 6. Inasmuch as the vent cap 6 has a higher coefficient of temperature expansion than the pin 14, this different in temperature expansion is ultimately effective to release the shrink fit connection between the pin 14 and the vent cap 6. At this time, the spring 8 is allowed to expand to propel the plate 10 and the barbs 12 into the diaphragm 18 to produce a piercing of the diaphragm 18. In order to further enhance the release of the excess pressure within the container 2, the plate 10 may be a loose fit within the vent cap 6 and may be additionally provided with vent holes (not shown) while the vent cap 6 may also be provided with a vent hole such as vent hole 22 in a wall thereof in the event that the end 15 of the pin 14 is not free of the whole 16 following the piercing of the diaphragm 19.

Figure 2:
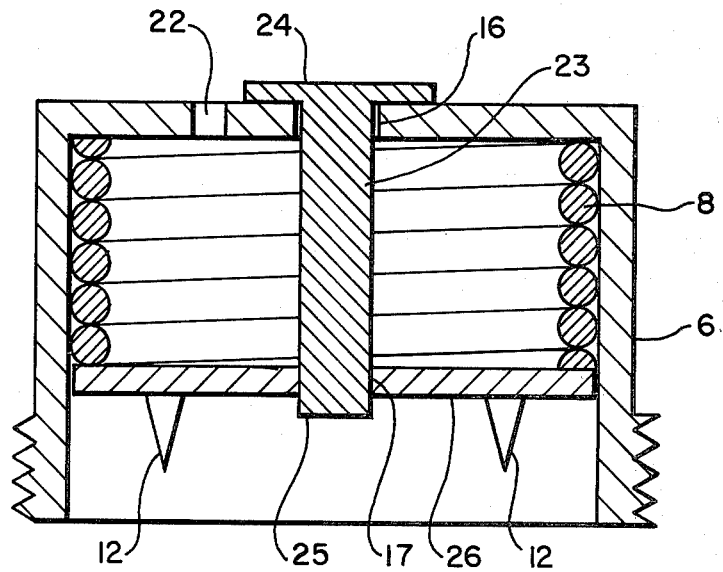

In FIG. 2, there is shown an example of an alternate embodiment of the vent of the present invention wherein a restraining pin 23 passes through the hole 16 in the cap 6 and is provided with a radially expanded head 24 located on the outside of the vent cap 6. A second end 25 of the pin 23 within the cap 6 is arranged to be attached to a barb carrying plate 25 by a shrink fit within the hole 17 in the plate 26. Thus, in this embodiment, the plate 26 would be of material having a higher coefficient of thermal expansion than the low coefficient of thermal expansion of the pin 23. In operation, the shrink fit connection between the end 25 of the pin 23 and the plate 26 is released by difference in temperature expansion between the plate 26 and the pin 23 in response to an abnormal temperature rise of a container sealed by the vent cap 6 to allow the spring 8 to propel the barbs 12 to pierce the diaphragm 18. Thus, in either case, the excess pressure in the container 4 is allowed to enter a fluid escape channel leading out of the vent housing 6. Vent holes (not shown) may be provided in the plate 26 to further enhance the venting of the excess pressure.

Accordingly, it may be seen that there has been provided, in accordance with the present invention, an improved heat activated vent.

The embodiments of the invention in which an exclusive property or privilege is claimed are defined as follows:

1. A vent comprising:
   a vent housing means having a fluid passage therein,
   a diaphragm means for sealing said passage,
   diaphragm piercing means within said housing,
   spring means for urging said diaphragm piercing means into said diaphragm means and
   heat responsive means in said vent housing means for spacing said diaphragm piercing means from said diaphragm means in opposition to said spring means below a predetermined temperature of said housing and for allowing said spring means to propel said diaphragm piercing means into said diaphragm means above said temperature.

2. A vent as set forth in claim 1 wherein said diaphragm piercing means includes a plate carrying a diaphragm piercing barb means and said heat responsive means includes a restraining pin means having one end restrained by said housing means and a second end attached to said plate by a shrink fit.

3. A vent as set forth in claim 2 wherein said pin means has a lower coefficient of thermal expansion than said plate.

4. A vent as set forth in claim 1 wherein said diaphragm piercing means includes a plate loosely captured within said housing means and carrying a diaphragm piercing barb means.

5. A vent as set forth in claim 3 wherein said pin means is made of Invar K and said plate is made of stainless steel.

6. A vent as set forth in claim 1 wherein said diaphragm piercing means includes a plate carrying a diaphragm piercing barb means and said heat responsive means includes a restraining pin means having one end restrained by said plate and a second end attached to said housing means by a shrink fit.

7. A vent as set forth in claim 6 wherein said pin means is made of Invar K and said housing is made of stainless steel.

8. A vent as set forth in claim 6 wherein said vent housing means includes a housing having a threaded end for attaching said vent housing means to a container.

9. A vent as set forth in claim 8 wherein said diaphragm means includes a thin pierceable diaphragm captured between said threaded end and the container.

10. A vent as set forth in claim 1 wherein said vent housing means includes a housing having a threaded end for attaching said vent housing means to a container.

11. A vent as set forth in claim 10 wherein said diaphragm means includes a thin pierceable diaphragm captured between said threaded end and the container.

12. A vent as set forth in claim 2 wherein said vent housing means includes a housing having a threaded end for attaching said vent housing means to a container.

13. A vent as set forth in claim 12 wherein said diaphragm means includes a thin pierceable diaphragm captured between said threaded end and the container.

* * * * *